(12) United States Patent
Li et al.

(10) Patent No.: US 6,181,834 B1
(45) Date of Patent: Jan. 30, 2001

(54) HYBRID IMAGE REDUCTION METHOD AND APPARATUS WITH MOIRÉ SUPPRESSION

(75) Inventors: Xing Li, Webster; Francis K. Tse, Rochester, both of NY (US)

(73) Assignee: Xerox Corporation, Stamford, CT (US)

( * ) Notice: Under 35 U.S.C. 154(b), the term of this patent shall be extended for 0 days.

(21) Appl. No.: 09/157,015

(22) Filed: Sep. 18, 1998

(51) Int. Cl.[7] ................................................ G06K 9/32
(52) U.S. Cl. .................... 382/298; 382/300; 358/445; 358/451; 358/454
(58) Field of Search ............................ 382/298, 299, 382/300, 276; 358/445, 451, 454, 532, 533

(56) References Cited

U.S. PATENT DOCUMENTS

| | | | |
|---|---|---|---|
| 4,412,252 | 10/1983 | Moore et al. | 348/580 |
| 5,237,432 | 8/1993 | Calarco et al. | 358/451 |
| 5,790,714 | * 8/1998 | McNeil et al. | 382/300 |

* cited by examiner

Primary Examiner—Thomas D. Lee
(74) Attorney, Agent, or Firm—Fay, Sharpe, Fagan, Minnich & McKee, LLP (57) ABSTRACT

A method and apparatus for digital image reduction using an improved "extendible" perspective projection technique which allows for flexible control of the averaging cell or window size separately from the reduction ratio to improve moiré suppression or sharpness as desired in the resulting reduced-size image. The extendible perspective projection technique can also be implemented together with ordinary perspective projection or together with a combined one-dimensional filter and linear interpolation technique to produce a reduced-size image of a quality comparable to those produced by the prior technique of using a two-dimensional pre-filter prior to interpolation at a much lesser cost due to the reduced number of required scanline buffers.

12 Claims, 4 Drawing Sheets

HYBRID IMAGE REDUCTION METHOD AND APPARATUS WITH MOIRÉ SUPPRESSION

BACKGROUND OF THE INVENTION

This application relates to the digital image processing arts. More particularly, the application relates to a method and apparatus for digital image reduction in an efficient and cost-effective manner, with good suppression of moiré and other undesirable artifacts as often become more pronounced in a downsampled image such as a reduced-size digital image. Such undesirable moiré has been found to be especially severe upon reduction of a scanned halftone image.

Digital image reduction is essentially a down-sampling process whereby image pixel data for a bitmap of n rows×m columns is used to construct a smaller bitmap of k rows×l columns, where k≦n and/or l≦m. Of course, while the location of each pixel in the new, reduced-size bitmap is known, its "gray" value is unknown and must be determined with reference to the original image.

Many methods are known for determining the gray value of each pixel in the reduced image. A relatively simple method is commonly referred to as "nearest neighbor" interpolation. In such case, if the reduced-size bitmap is viewed as being superimposed over the original image bitmap, the gray value for each new pixel is simply the value of the spatially closest pixel in the original bitmap. Although fast, nearest neighbor interpolation is often not satisfactory in terms of the quality of the resulting reduced-size image.

Another common interpolation technique used in digital image downsampling is bilinear interpolation. Using bilinear interpolation, the newly generated pixel gray value is set to be the weighted sum of the four nearest original pixels. The weights are determined linearly—i.e., each weight is inversely proportional to the distance from each original pixel. Bilinear interpolation has been found to yield higher quality reduced-size images relative to nearest neighbor interpolation. Of course, bilinear interpolation also requires significantly more computational effort compared to nearest neighbor interpolation. Additionally, bilinear interpolation still often results in severe moiré and other undesirable artifacts in the new image.

Techniques have been proposed and implemented for reducing moiré which becomes apparent due to downsampling. One prior method involves the application of a two-dimensional low-pass filter to the pixel data of the original image prior to the downsampling operation. The low-pass filter has the effect of reducing high-frequency content in the original image—i.e., the filter has the effect of somewhat "blurring" the original image. This filtered image data is then used in the scaling operation and results in a reduced-size image with less severe moiré. Unfortunately, the circuitry required to apply a useful two-dimensional filter to the original image data is expensive to implement. In particular, a relatively large number of scanline buffers are needed to store pixel data from multiple scanlines of the original image. For example, in order to apply a 5×5 filter, at least four scanline buffers would typically be needed for the incoming original image data. These scanline buffers add significant expense to the reduction apparatus. Furthermore, reduction of color digital images requires this circuitry to buffer the original image data for each color separation of the original image.

Another prior technique used to reduce moiré resulting from downsampling is sometimes referred to as "perspective projection." Perspective projection creates a new pixel from the original image data by averaging a correspondingly located area of the original image. While perspective projection has also been found to be generally effective in reducing moiré, in certain cases, such as in the downsampling of halftone image data, moiré is still apparent in the resulting image.

Moiré apparent after downsampling using perspective projection reduction has resulted from the fact that, heretofore, perspective projection has been implemented so that the size of the area of the original image that is averaged is a linear function of the image reduction ratio. The reduction ratio is defined as 1/scale, where scale=a scaling factor such as 0.5 (a reduction to 50% original size), 0.8 (a reduction to 80% original size), etc. For example, in reducing an image to 50% of original size, a reduction ratio of 2 results (i.e., 1/0.5=2), and a 2×2 pixel area in the original image is used for averaging. In another example, in reducing an image to 80% of original size, a reduction ratio of 1.25 results (i.e., 1/0.8=1.25), and a 1.25×1.25 pixel area in the original image is averaged.

It should be apparent from the foregoing that prior perspective projection techniques have not provided any means by which the area averaged in the original image can be controlled separately from the reduction ratio. Accordingly, prior perspective projection methods have not allowed for any control of moiré suppression v. sharpness, with enhanced moiré suppression provided by a larger averaging area and enhanced sharpness provided by a smaller averaging area.

Accordingly, in light of the foregoing and other deficiencies associated with prior digital image downsampling methods and apparatus, it has been deemed desirable to develop a method and apparatus for digital image reduction using an improved "extendible" perspective projection technique which allows for flexible control of the averaging cell or window size separately from the reduction ratio to improve moiré suppression or sharpness as desired in the resulting reduced-size image.

Furthermore, it has been deemed desirable to provide a method and apparatus wherein the extendible perspective projection technique is implemented together with ordinary perspective projection or together with a combined one-dimensional filter and linear interpolation technique to produce a reduced-size image of a quality comparable to those produced by the prior technique of using a two-dimensional pre-filter prior to interpolation at a much lesser cost due to the reduced number of required scanline buffers.

SUMMARY OF THE INVENTION

In accordance with the present invention, a hybrid image reduction method and apparatus are provided for cost-effective scale reduction of digital images with flexible control of moiré suppression v. image sharpness.

In accordance with a first aspect of the invention, a method of downsampling an input digital image defined by plural image pixel gray values arranged in n rows extending in a fast scan direction and m columns extending in a slow scan direction to a reduced-size output image defined by plural image pixel gray values arranged in k rows and l columns, wherein k≦n and/or l≦m includes determining a plurality of averaging areas in said input image, each averaging area corresponding to an image pixel gray value location in said output image and defined by dimensions efs in the fast scan direction and ess in the slow scan direction, wherein efs and ess are determined according to efs=fs_factor/fs_scale ess=ss_factor/ss_scale and wherein fs_scale and ss scale are scaling factors for the input image in the fast scan and slow scan directions, respectively. The parameters fs_factor and ss_factor are selected independently of each other according to:

fs_factor>0 ss_factor>0 wherein at least one of fs_factor and ss_factor≠1. For each of said plurality of averaging areas of said input image, an average of the input image pixel gray values at least partially encompassed thereby is obtained and the correspondingly located image pixel gray value location in the output image is assigned the average of the input image pixel gray values at least partially encompassed by the averaging area.

In accordance with another aspect of the present invention, a hybrid method for downsampling image pixel data of an input digital image by fs_scale in a fast scan direction and by ss_scale in a slow scan direction includes applying a onedimensional low-pass filter to image pixel gray values of the input image in only the fast scan direction to obtain intermediate, filtered grey value pixel data. Thereafter, the intermediate, filtered pixel gray values are downsampled in the fast scan direction using perspective projection reduction and, in said slow scan direction, using extendible perspective projection reduction. The downsampling operations include determining a plurality of averaging areas for the intermediate pixel data, each of the averaging areas associated with a correspondingly located output image pixel grey value area in an output image and defined by a dimension ef s in the fast scan direction and a dimension ess in the slow scan direction. The dimensions efs and ess are selected according to:

efs=1/fs_scale ess=ss_factor/ss_scale wherein ss_factor>1. For each of the plurality of averaging areas, an average gray value of the filtered gray value pixel data at least partially within the averaging area is obtained and assigned to the correspondingly located output image pixel gray value area.

In accordance with another aspect of the present invention, a hybrid method of image scale reduction includes applying a one-dimensional low-pass filter to image pixel data of an input image in only a fast scan direction. Thereafter, the input image is downsampled in the slow scan direction using an extendible perspective reduction and downsampling in the fast scan direction using one of linear interpolation and perspective projection. The extendible perspective projection reduction includes determining input image gray value averages in each of a plurality of averaging areas defined by a fast scan dimension efs and a slow scan dimension ess, wherein efs and ess are selected according to:

ess=ss_factor/ss_scale wherein ss_scale is a scaling factor for the input image in the slow scan direction and wherein ss factor>1. The dimension efs=1 when linear interpolation is used to downsample the input image in the fast scan direction and efs>1 when perspective projection is used to downsample the input image in the fast scan direction.

In accordance with yet another aspect of the invention, an image reduction apparatus for reducing an input image having n rows and m columns to a reduced size image having ss_scale*n rows and fs_scale*m columns includes means for calculating an average gray value for each of a plurality of averaging areas in the input image according to input image gray value pixel data located in each of the areas. Each of the averaging areas defined by dimensions efs and ess wherein:

efs=fs_factor/fs_scale; 1<fs_factor≤2 ess=ss_factor/ss_scale; 1<ss_factor≤2;

The apparatus further includes means for outputting the reduced-size image defined by a plurality of gray values, wherein each of the gray values of the reduced-size image is set equal to the average gray value calculated for the correspondingly located averaging area in the input image.

One advantage of the present invention resides in the provision of a new and improved method and apparatus for cost-effective size reduction of digital images with moiré suppression.

Another advantage of the present invention is found in the provision of a method and apparatus for digital image reduction allowing for flexible control of moiré suppression and image sharpness.

A further advantage of the present invention is that the flexible control of moiré suppression v. sharpness can be controlled by user input and/or by embedded image segmentation tags which identify characteristics of the original image data that is to be downsampled.

Still another advantage of the present invention is the provision of a hybrid image reduction method and apparatus which utilizes more than one image downsampling method to enhance the quality of the resulting image at a reduced cost.

A still further advantage of the present invention is found in the use of a one-dimensional filter together with subsampling within each scanline of the original image, together with an extendible perspective projection downsampling technique among different scanlines of the original image to produce high-quality reduced-size images in a cost-effective manner.

Still other benefits and advantages of the present invention will become apparent to those of ordinary skill in the art upon reading and understanding the present specification together with the accompanying drawings.

BRIEF DESCRIPTION OF THE DRAWINGS

The invention may take form in various steps and arrangements of steps, and in various components and arrangements of components. The drawings are only for purposes of illustrating preferred embodiments of the invention, and are not intended to limit the invention in any way.

DETAILED DESCRIPTION OF PREFERRED EMBODIMENTS

Figure 1:
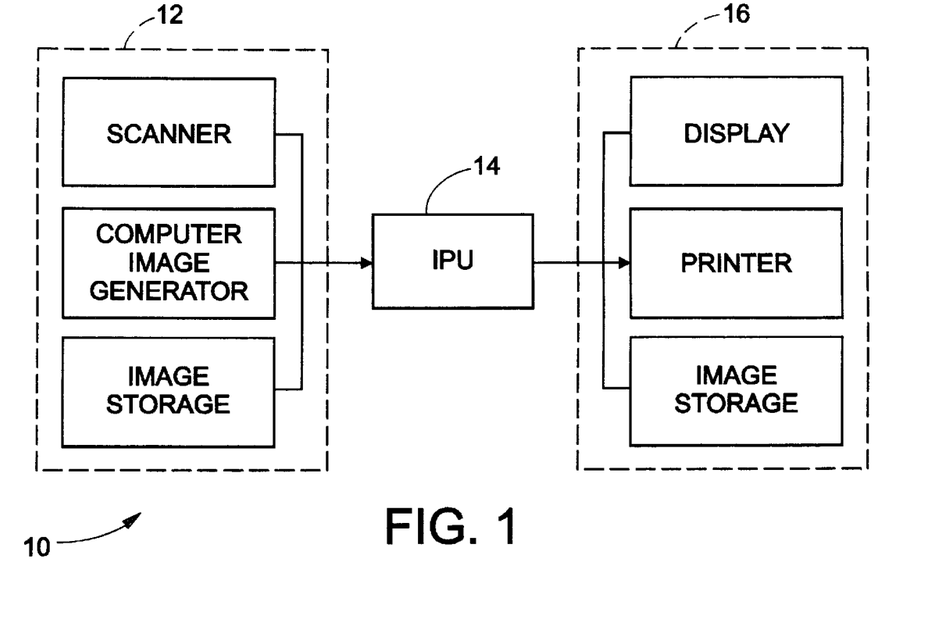
FIG. 1 is a simplified block diagram illustrating a digital image processing system in accordance with the present invention.

Referring now to the drawings where the showings are for purposes of describing preferred embodiments of the invention only and not for purposes of limiting same, a digital image processing system 10 in accordance with the present invention is shown in FIG. 1. An image input terminal 12, comprising a scanner, computer image generator, an image storage device, or the like, derives or delivers digital image data in the form of one or more monochromatic separations, wherein the picture elements or "pixels" of each separation are defined at a depth of "d" bits per pixel where "d" is an integer. Accordingly, each pixel of each separation is defined in terms of "d" bits per pixel(bit depth=d), and each pixel has some "gray" value between full "off" and full "on." When the digital image data is provided in terms of a single monochromatic separation, the image is monochromatic, for example, so called "black-and-white" image data. On the other hand, when the digital image data is provided in terms of two or more monochromatic separations, a color image results when the data from the separations is combined, for example, red-green-blue (RGB) separations or cyan-magenta-yellow (CMY) separations.

The image signals are input to an image processing unit 14 wherein digital image processing, such as image scaling in accordance with the present invention, is performed. The image processing unit 14 may be provided by any suitable electronic computing apparatus such as an electronic computer, a dedicated electronic circuit, or any other suitable electronic circuit means. The image processing unit 14 outputs data in a suitable format to an image output terminal 16 such as a digital printer. Suitable apparatus for digital image input and/or output include the XEROX Document Center 265DC digital imaging system, Pixelcraft 7650 Pro Imager Scanner, XEROX DocuTech Production Printing System scanners, the XEROX 5775 digital color copier, the XEROX 5760 and 5765 Majestik digital color copiers, or any other suitable digital scanner and/or copier. Regardless of the depth d at which each pixel is defined, the location of each pixel in each separation bitmap is also defined, typically in terms of a row n and a column m.

Figure 2:
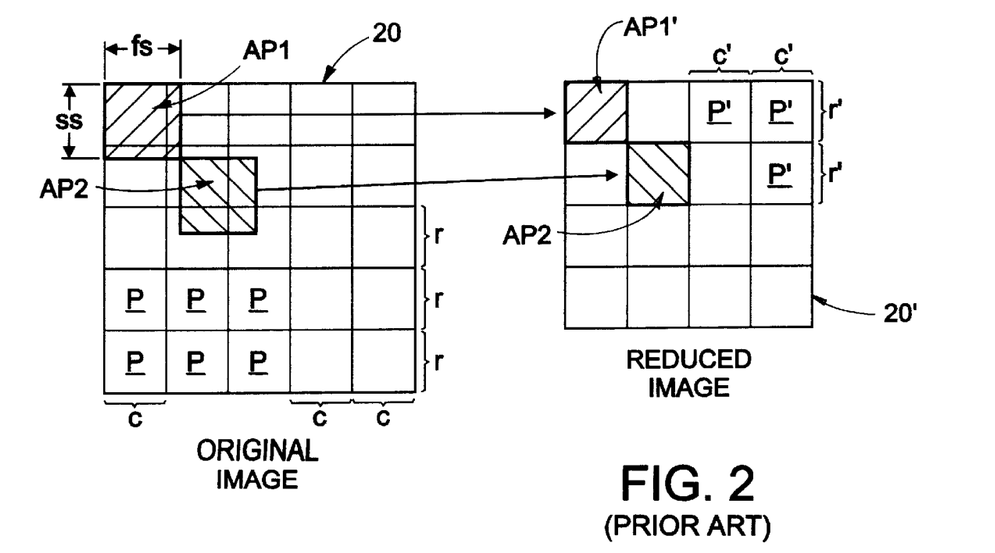
FIG. 2 diagrammatically illustrates conventional perspective projection image reduction.

With reference now also to FIG. 2, conventional perspective projection image reduction or downsampling as is generally known is illustrated for purposes of understanding the present invention and its advantages relative to perspective projection as illustrated in FIG. 2. For convenience of illustration, each image processing operation described herein, including that illustrated in FIG. 2, is explained with reference to digital image data comprising only a single, monochromatic bitmap or separation. However, those of ordinary skill in the art will recognize that the invention has equal application to color digital images comprised of multiple separations of image data by performing the operations described herein on each separation of the image. Furthermore, the image processing operations described herein have application to digital images of any size, and the illustrated examples were chosen for facilitating understanding of the invention.

The conventional perspective projection image reduction or scaling operation illustrated in FIG. 2 is carried out in the image processing unit 14 as are all other image processing operations described herein. An original image bitmap 20 is input to the image processing unit 14 and comprises a plurality of scanlines or rows r and columns c of image pixels or pixel data P (i.e., gray values) which vary to control the appearance of the image 20. Each row r of image pixel data P is said to extend in a "fast scan" direction and each column c of image pixel data is said to extend in a "slow scan" direction i.e., fast scan processing occurs within a scanline r while slow scan processing occurs between scanlines r.

In the example illustrated in FIG. 2, the original image 20 comprises 5 rows r and 5 columns c of image pixel data P. Based upon user input to the image processing unit 14, it is desired to scale the original image 20 to 80% of its original size—i.e., to reduce the image to a new output image 20' comprising 4 rows r' and 4 columns c' of image pixel data P'. The pixel data P' in the output image 20' must be chosen so that the features of the original image 20 are still satisfactorily apparent in the image 20' even though less image pixel data P' is available to represent the features. Accordingly, the illustrated perspective projection operation is used to downsample the image 20 to the image 20' in a manner that accurately reproduces the image 20 in the smaller image 20'.

Using conventional perspective projection reduction, the output pixel data P' is obtained from the original image 20 by averaging pixel data P in an area of the original image 20 that corresponds to the location of the desired output pixel data P' in the output image 20'. This averaging of corresponding areas can be visualized as dividing the original image 20 into a 4×4 matrix of equal size averaging cells AP1,AP2 (only two cells shown for clarity) as required for the output image 20' and so that each averaging cell AP1, AP2 corresponds to a single like location AP1',AP2' in the output image 20'. This, then, allows the weighted average of the pixel data P encompassed or partially encompassed by each averaging cell AP1,AP2 to be calculated according to the relative spatial contribution of the encompassed or partially encompassed pixel data P to the cell AP1,AP2. Use of a weighted average accounts for the fact that each relevant item of pixel data P in the original image 20 does not contribute equally to the area of the averaging cell AP1,AP2.

Each averaging cell AP1,AP2 has a size defined by fast scan dimension fs and a slow scan dimension ss. The dimensions fs,ss can be determined mathematically according to the following:

fs=1/fs_scale
ss=1/ss_scale;

wherein fs_scale and ss_scale are the factors by which the original image 20 is scaled in the fast scan and slow scan directions, respectively. For example, if an image is to be scaled to 50% of its original size in both the fast scan and slow scan directions, fs_scale=ss_scale=0.5. In the present example, the original image 20 is to be scaled to 80% of its original size. Accordingly, fs_scale=ss_scale 0.8. Therefore, fs and ss are determined as follows:

fs=1/0.8=1.25
ss=1/0.8=1.25

Each averaging cell AP1,AP2 encompasses 1.25 items of image pixel data P in the fast scan direction and 1.25 items of pixel data P in the slow scan direction.

As is described in detail above, conventional perspective projection reduction as illustrated in FIG. 2 often results in an output image 20' that exhibits severe or unacceptable moiré. The moiré is often especially apparent in reducing a halftone original image 20. The moiré results from the fact that the area encompassed by each averaging cell AP1,AP2 is insufficient. However, as is illustrated in the above formulas, the area of each averaging cell AP1,AP2 is inseparably tied to the fs_scale and ss_scale factors. Thus, further moiré suppression is not possible using conventional perspective projection methods.

Figure 3:
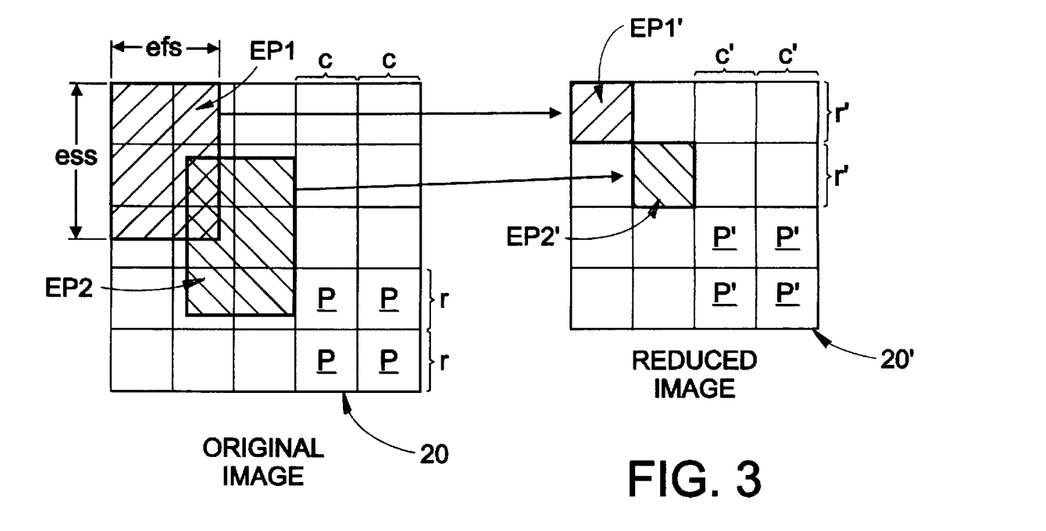
FIG. 3 diagrammatically illustrates extendible perspective projection image reduction in accordance with the present invention.

Turning now to FIG. 3, extendible perspective projection in accordance with the present invention is illustrated. Extendible perspective projection as described herein has many advantages over prior art perspective projection, including the ability to adjust the size of the averaging cells to enhance moiré suppression. For ease of understanding extendible perspective projection in accordance with the invention, like features illustrated in FIG. 3 relative to those illustrated in FIG. 2 are identified with like reference characters and numerals.

Extendible perspective projection reduction in accordance with the present invention comprises obtaining the output pixel data P' from the original image 20 by averaging pixel data P in a rectangular (including a square) area of the original image 20 that corresponds to the location of the desired output pixel data P' in the output image 20'. As shown in FIG. 3, the weighted average of the pixel data P encompassed by an averaging cell EP1 in the original image 20 is calculated to obtain the gray value data for a correspondingly located area EP1' of the output image 20'. Likewise, the weighted average of the pixel data P encompassed by an averaging cell EP2 in the original image 20 is calculated to obtain the gray value data for a correspondingly located area EP2' of the output image 20'. By repeating this operation for each of the unknown items of output pixel data P' in the output image 20', the reduced size image 20' is obtained.

Determining the location and size of each extendible perspective projection averaging cell EP1,EP2 can be thought of initially as described in relation to conventional perspective projection as discussed in relation to FIG. 2—i.e, the original image 20 is divided into a matrix of equal size averaging cells, with each of the cells corresponding in location to an item of output pixel data P' required for the output image 20'. However, unlike conventional perspective projection described above, each averaging cell EP1,EP2 (only two shown for clarity) is expanded or extended in the fast scan and slow scan directions—to the right and downward as illustrated in FIG. 3—so that each extendible perspective projection averaging cell EP1,EP2 has a larger size, relative to the ordinary perspective projection averaging cell AP1,AP2, defined by an extended fast scan dimension efs and an extended slow scan dimension ess. Those of ordinary skill in the art will recognize that the averaging cells EP1,EP2 may be extended bi-directionally in both the fast scan direction and the slow scan direction, e.g., so that the pixel P of interest in the original image 20 is centrally located in the averaging area EP1,EP2. The dimensions efs,ess can be determined mathematically according to the following:

efs=fs_factor/fs_scale
ess=ss_factor/ss_scale;

wherein fs_scale and ss_scale are the scaling factors for the original image 20 in the fast scan and slow scan directions, respectively, as described above, and wherein fs_factor and ss_factor are programmable parameters which vary, preferably according to $1 \leq fs\_factor \leq 2$; $1 \leq ss\_factor \leq 2$, wherein at least one of fs_factor and ss_factor is not equal to 1; fs_factor and/or ss_factor may also be less than 1 when increased image sharpness is desired.

The parameters fs_factor and ss_factor are preferably chosen according to user input to the image processing unit 14 through use of a sharpness and/or moiré suppression input selector switches to the unit 14. Those skilled in the art will recognize that, as fs_factor and ss_factor increase toward 2, the dimensions efs and ess increase, respectively. Conversely, as fs_factor and ss_factor approach 1, the dimensions efs and ess approach the dimensions fs and ss as would be obtained through conventional perspective projection. When fs_factor and ss_factor are less than 1, image sharpness increases even further with less moiré suppression. Those skilled in the art will also recognize that, as the dimensions efs and ess increase, more image pixel data P will be averaged to obtain each item of output pixel data P' in the output image 20' leading to reduced sharpness but increased moiré suppression. On the other hand, as efs and ess decrease and approach fs and ss, respectively, sharpness increases with less effective moiré suppression in the output image 20'. This, then, allows a user to select enhanced moiré suppression or enhanced sharpness, as desired, with the described trade-off therebetween. It is noted that the parameters fs_factor and ss_factor may also be varied automatically by the image processing unit 14 in accordance with segmentation tags associated with each pixel P of the original image 20 for identifying the type of image data represented by that pixel—e.g., text, halftone, continuous tone, or the like. For example, if the original image 20 was comprised of halftone pixel data as indicated by segmentation tags, the image processing unit would increase fs_factor and ss_factor to suppress moiré, while if the original image 20 was comprised of continuous tone data as indicated by segmentation tags, the image processing unit would decrease fs_factor and ss_factor to increase sharpness.

In the example illustrated in FIG. 3, the image 20 is to be reduced to 80% of its size in an image 20'. Therefore, fs_scale ss_scale=0.8. A user has selected enhanced moiré suppression and the image processing unit has set fs_factor=1.4 and ss_factor=2.0. This leads to the calculation of efs and ess as follows:

efs=1.4/0.8=1.75
ess=2/0.8=2.5 so that each extendible perspective averaging cell EP1,EP2 encompasses 1.75 pixels P in the fast scan direction and 2.5 pixels P in the slow scan direction. In doing extendible perspective projection reduction in accordance with the present invention, the original image 20 can be viewed as a continuous two-dimensional function with each pixel being a unit square filled with its gray value P. The pixel value P' in the scaledown image is calculated as the integral of the two-dimensional function over the area efs×ess, divided by that area.

Figure 4A:
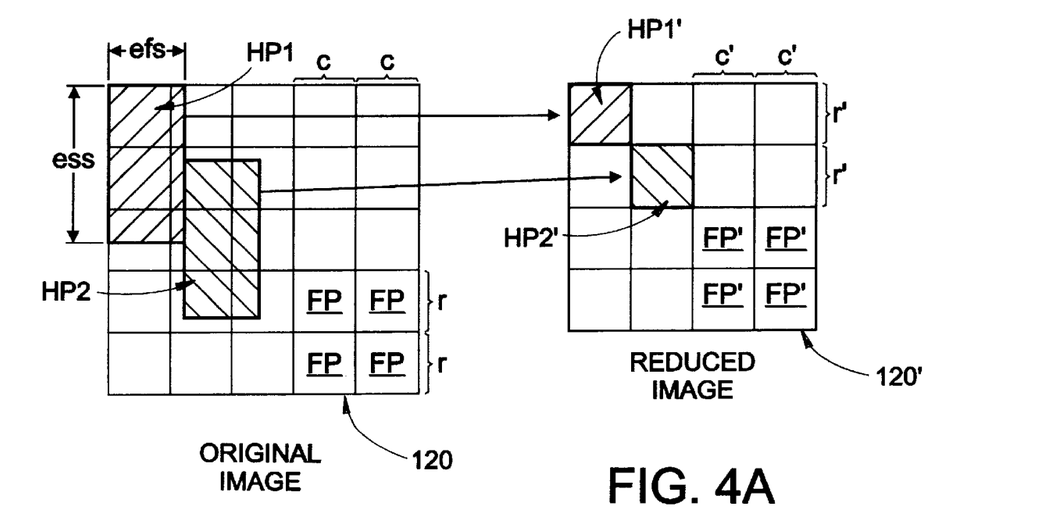
FIG. 4A illustrates a hybrid image reduction method in accordance with the present invention using perspective projection in the fast scan direction (i.e., within a scanline) and using extendible perspective projection in the slow scan direction (i.e., between successive scanlines)
Figure 4B:
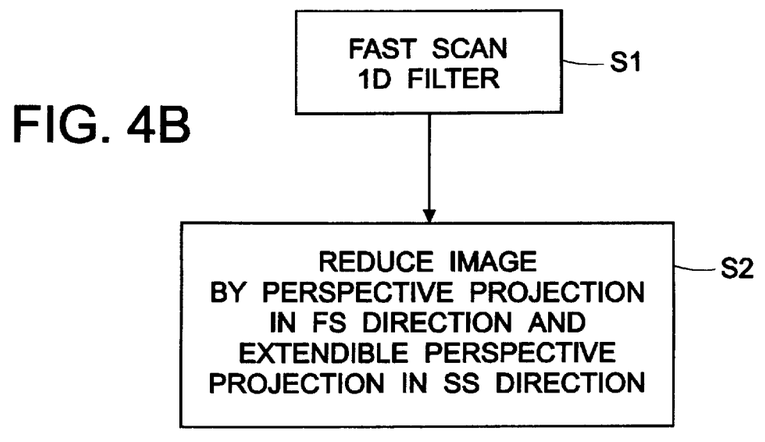
FIG. 4B is a flow chart illustrating a hybrid digital image reduction method in accordance with one embodiment of the present invention.
Figure 4C:
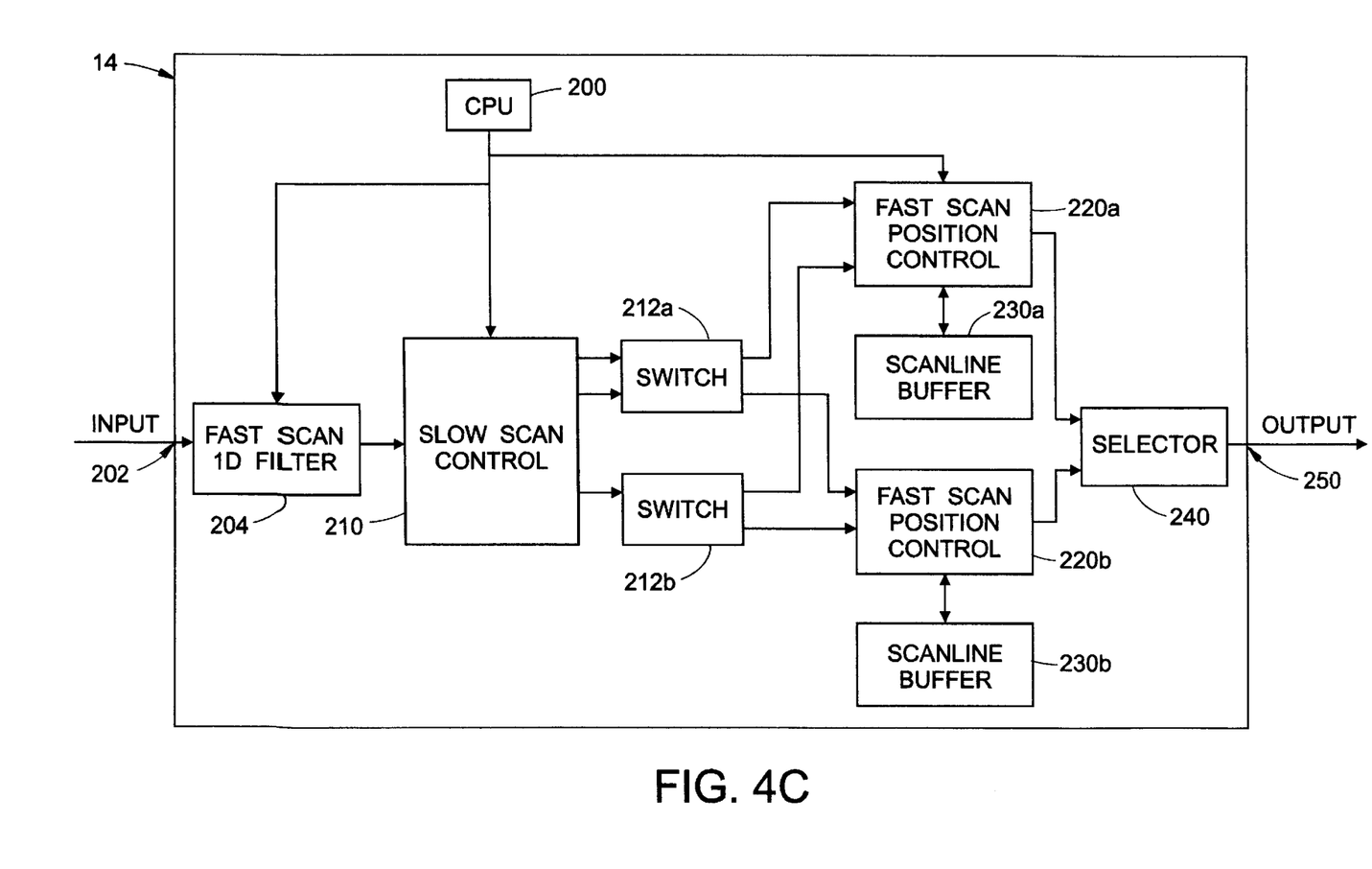
FIG. 4C is a simplified block diagram illustrating a hybrid digital image reduction apparatus in accordance with the present invention; and, FIG. 5 is a flow chart illustrating a hybrid digital image reduction method in accordance with another embodiment of the present invention.

FIGS. 4A–4C illustrate hybrid image reduction or downsampling employing extendible perspective projection reduction in accordance with the present invention. For ease of understanding FIG. 4A, like features therein relative to those illustrated in FIG. 3 are identified with like reference characters and numerals, and new features are illustrated with new reference characters and numerals.

With particular reference to FIG. 4B a step or means S1 applies a one-dimensional fast scan direction low-pass filter to the image pixel data of the original image (not shown). Since a one-dimensional filter in the fast scan direction comes at almost no additional cost, a relatively large filter size, e.g., 11, 13, 15, or any other suitable number of elements, is preferably used. The filtering operation results in an intermediate image 120 (FIG. 4A) of the same size as the original image but including filtered image pixel data FP. The intermediate image 120 is then reduced using a hybrid method according to the present invention by a step or means S2 to yield the downsampled pixel data FP' for the reduced-size output image 120'.

In a first embodiment of hybrid image reduction in accordance with the invention, the intermediate image is reduced by extendible perspective projection in the slow scan direction and conventional perspective projection in the fast scan direction. Accordingly, the fast scan and slow scan dimensions efs,ess of each hybrid averaging cell HP1,HP2 (only two shown for clarity) applied to the intermediate image 120 are determined as follows:

efs=1/fs_scale
ess=ss_factor/ss_scale wherein fs_scale and ss_scale are the factors by which the intermediate image 120 is scaled in the fast scan and slow scan directions, respectively, as described above, and wherein ss_factor is a programmable parameter which varies, preferably according to $1 \leq ss\_factor \leq 2$. The weighted average of filtered pixel data FP encompassed by each cell HP1,HP2 is used as the gray value in a correspondingly located area HP1',HP2' of the output image 120'.

FIG. 4C is a simplified block diagram of an image processing unit 14 suitable for carrying out hybrid image reduction as illustrated in FIGS. 4A and 4B. A central processing unit 200 performs all required calculations. The original image is input at 202 to the image processing unit 14 and fed to a fast scan one-dimensional filter 204, which is preferably a one-dimensional fast scan direction low-pass filter, for purposes removing high-frequency components from the original image data in the fast scan direction. The fast scan filtered, intermediate image data is fed to a slow scan control unit 210 which, through first and second switches 212a,212b, controls the flow of fast scan filtered image data FP to first and/or second fast scan position control units 220a,220b. The fast scan position control units control the flow of filtered data FP into first and second scanline buffers 230a,230b, respectively, as is required to perform the combined perspective projection and extendible perspective projection reduction operations described above. An output selector control 240 controls the flow of output image pixel data FP' from the first and second scanline buffers 230a,230b to a reduced image data output 250.

Figure 5:
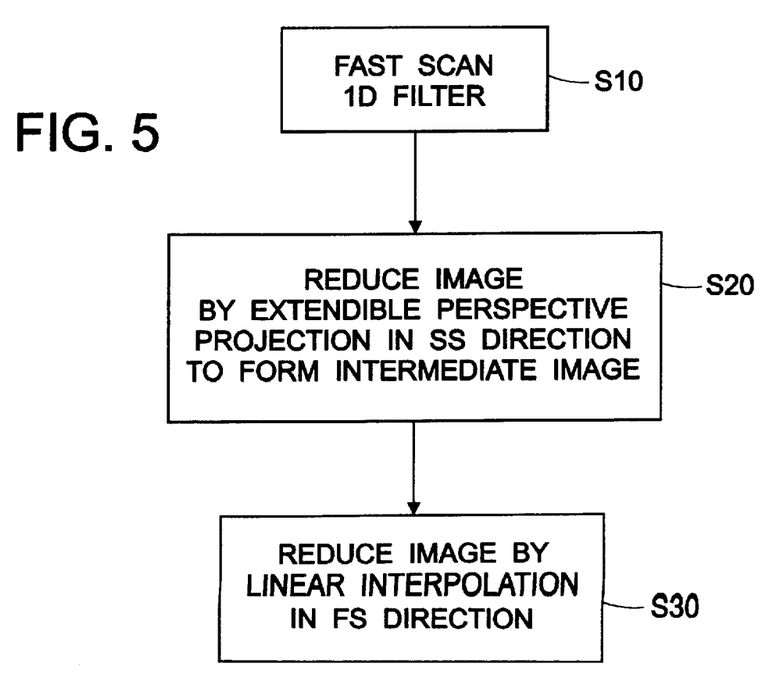

FIG. 5 illustrates another hybrid image reduction method in accordance with the present invention wherein a step or means S10 applies a one-dimensional fast scan filter to the original image data as described above. The resulting intermediate image is then reduced by a step or means S20 in the slow scan direction to form an intermediate image 120. The step or means S20 preferably performs an extendible perspective reduction operation wherein:

efs=1/1=1
ess=ss_factor/ss_scale so that the intermediate image is reduced only in the slow scan direction. A step or means S30 downsamples the image resulting from the step or means S20 in the fast scan direction, preferably using conventional linear interpolation, although any other suitable fast scan direction subsampling method may be used. Those of ordinary skill in the art will recognize that the steps S20 and S30 may be carried out in reverse order (i.e., fast scan linear interpolation S30 before slow scan extendible perspective projection S20) without departing from the overall scope and intent of the present invention.

The invention has been described with reference to preferred embodiments. Modifications and alterations will occur to others upon reading and understanding the preceding specification. It is intended that the invention be construed as including all such modifications and alterations insofar as they fall within the scope of the appended claims or equivalents thereof.

Having thus described the preferred embodiments of the invention, the invention is claimed to be:

1. A method of downsampling an input digital image defined by plural image pixel gray values arranged in n rows extending in a fast scan direction and m columns extending in a slow scan direction to a reduced-size output image defined by plural image pixel gray values arranged in k rows and l columns, wherein k<n and $1 \leq m$ or $k \leq n$ and $1 \leq m$, said method comprising:

determining a plurality of averaging areas in said input image, each averaging area corresponding to an image pixel gray value location in said output image and defined by dimensions efs in the fast scan direction and ess in the slow scan direction, wherein efs and ess are determined according to
   efs=fs_factor/fs_scale
   ess=ss_factor/ss_scale
   and wherein fs_scale and ss_scale are scaling factors for the input image in the fast scan and slow scan directions, respectively, fs_factor and ss_factor selected independently of each other according to:
   fs_factor>0
   ss_factor>0
   and so that at least one of fs_factor and ss_factor≠1;
   for each of said plurality of averaging areas of said input image, obtaining an average of the input image pixel gray values at least partially encompassed thereby; and,
   for each of said plurality of averaging areas of the input image, assigning the correspondingly located image pixel gray value location in the output image the average of the input image pixel gray values in the averaging area.

2. The method of downsampling an input digital image as set forth in claim 1 wherein fs_factor>1 and wherein ss_factor>1.

3. The method of downsampling an input image as set forth in claim 1 further comprising an initial step of filtering the image pixel gray values of said input digital image in only the fast scan direction using a one-dimensional low-pass filter, wherein fs_factor=1 and ss_factor>1.

4. The method of downsampling an input digital image as set forth in claim 3, wherein ss_factor is selected according to $1 \leq ss\_factor \leq 2$.

5. The method of downsampling an input digital image as set forth in claim 1, wherein fs_factor and ss_factor are each selected according to:
   $1 \leq fs\_factor \leq 2$
   $1 \leq ss\_factor \leq 2$.

6. The method of downsampling an input digital image as set forth in claim 5, wherein the average of the input image pixel gray values at least partially encompassed by each of said plural averaging areas is a weighted average determined according to the spatial contribution of each input image gray value at least partially encompassed by the averaging area to the averaging area.

7. A hybrid method for downsampling image pixel data of an input digital image by a factor of fs_scale in a fast scan direction and by a factor of ss_scale in a slow scan direction, said hybrid method comprising:

applying a one-dimensional low-pass filter to image pixel gray values of said input image in only said fast scan direction to obtain intermediate, filtered grey value pixel data;

thereafter, downsampling said intermediate, filtered pixel gray values in said fast scan direction using perspective projection reduction and, in said slow scan direction, using extendible perspective projection reduction, said downsampling operations including:

determining a plurality of averaging areas for said intermediate pixel data, each of said averaging areas associated with a correspondingly located output image pixel grey value area in an output image and defined by a dimension efs in the fast scan direction and a dimension ess in the slow scan direction, wherein efs and ess are selected according to:

efs=1/fs_scale ess=ss_factor/ss_scale wherein ss_factor>1;

for each of said plurality of averaging areas, obtaining an average gray value of the filtered gray value pixel data at least partially within the averaging area and assigning the average gray value for that averaging area to the correspondingly located output image pixel gray value area.

8. The hybrid method of downsampling image pixel data as set forth in claim 7 wherein said average gray value obtained for each of said plurality of averaging areas is a weighted average calculated according to the spatial contribution of said intermediate, filtered gray value pixel data to said averaging area.

9. The hybrid method of downsampling image pixel data as set forth in claim 8, wherein ss_factor is selected according to 1<ss_factor≦2.

10. A hybrid method of image scale reduction comprising:

applying a one-dimensional low-pass filter to image pixel data of an input image in only a fast scan direction;

downsampling said input image in the slow scan direction using an extendible perspective reduction;

downsampling said input image in the fast scan direction using one of linear interpolation and perspective projection, said extendible perspective projection reduction in the slow scan direction comprising determining input image gray value averages in each of a plurality of averaging areas defined by a fast scan dimension efs and a slow scan dimension ess, wherein efs and ess are selected according to:

a) ess=ss_factor/ss_scale wherein ss_scale is a factor by which said input image is to be scaled in the slow scan direction and wherein ss_factor>1, and b) efs=1 when linear interpolation is used to downsample said input image in the fast scan direction, and c) efs>1 when perspective projection is used to downsample said input image in the fast scan direction.

11. The hybrid image scale reduction method as set forth in claim 10 wherein ss_factor is selected according to:

1<ss_factor≦2.

12. An image reduction apparatus for reducing an input image having n rows and m columns to a reduced size image having ss_scale*n rows and fs_scale*m columns, said apparatus comprising:

means for calculating an average gray value for each of a plurality of averaging areas in the input image according to input image gray value pixel data located in each of said averaging areas, each of said averaging areas defined by dimensions efs and ess wherein:

efs=fs_factor/fs_scale; 1<fs_factor≦2 ess=ss_factor/ss_scale; 1<ss_factor≦2;

means for outputting the reduced-size image defined by a plurality of gray values, wherein each of said reduced-size gray values is set equal to the average gray value calculated for the correspondingly located averaging area in said input image.

* * * * *